United States Patent
Kassler et al.

(10) Patent No.: US 10,305,586 B1
(45) Date of Patent: May 28, 2019

(54) COMBINED SIGNAL RESPONSES IN AN OPTICAL TIME-DOMAIN REFLECTOMETER

(71) Applicant: Fluke Corporation, Everett, WA (US)

(72) Inventors: Harlan L. Kassler, Austin, TX (US); Seymour Goldstein, Austin, TX (US); Jackson L. Salling, Austin, TX (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 15/473,387

(22) Filed: Mar. 29, 2017

(51) Int. Cl.
*H04B 10/071* (2013.01)

(52) U.S. Cl.
CPC .................. *H04B 10/071* (2013.01)

(58) Field of Classification Search
USPC ...................................... 398/13, 21
See application file for complete search history.

(56) References Cited

U.S. PATENT DOCUMENTS

| | | | | |
|---|---|---|---|---|
| 5,069,544 A * | 12/1991 | Buerli | ................ | G01M 11/3145 356/73.1 |
| 5,528,356 A * | 6/1996 | Harcourt | ............ | G01M 11/3136 356/73.1 |
| 5,808,761 A * | 9/1998 | Stewart | ................ | H04B 10/071 356/73.1 |
| 5,963,313 A * | 10/1999 | Anderson | .......... | G01M 11/3145 356/73.1 |
| 6,009,220 A * | 12/1999 | Chan | .................... | H04B 10/071 385/24 |
| 6,445,445 B1 * | 9/2002 | Nakayama | ......... | G01M 11/3136 356/73.1 |
| 6,611,322 B1 * | 8/2003 | Nakayama | .......... | G01M 17/027 356/73.1 |
| 7,974,032 B1 * | 7/2011 | Song | ................ | G11B 20/10009 360/45 |
| 8,213,002 B2 * | 7/2012 | Kassler | .............. | G01M 11/3145 356/73.1 |
| 2006/0053185 A1 * | 3/2006 | Sureka | ............... | H03H 17/0248 708/300 |

(Continued)

OTHER PUBLICATIONS

Tektronix, "Optical Time Domain Reflectometer NetTek® OTDR", 2003, 8 pages, accessed on Oct. 12, 2017 at https://www.tek.com/datasheet/nettek-otdr.

(Continued)

*Primary Examiner* — David C Payne
*Assistant Examiner* — Pranesh K Barua
(74) *Attorney, Agent, or Firm* — Seed IP Law Group LLP

(57) ABSTRACT

An optical time-domain reflectometer (OTDR) is provided. The OTDR emits a first optical signal that is an impulse optical signal having a non-zero power during a first period of time, where the first period of time is shorter than a period of time necessary for the first optical signal to traverse a length of an optical fiber under test. The OTDR emits a second optical signal that is an impulse optical signal having a non-zero power during a second period of time longer than a period of time necessary for the second optical signal to traverse the length of the optical fiber. The OTDR receives data representative of a third and fourth optical signals that are reflections of the first and second optical signals, respectively, by the optical fiber and generates an optical time-domain reflectometry signal based at least in part on the third and fourth optical signals.

14 Claims, 8 Drawing Sheets

(56) References Cited

U.S. PATENT DOCUMENTS

| | | | | |
|---|---|---|---|---|
| 2006/0195502 A1* | 8/2006 | Sureka | ............... | H03H 17/0213 |
| | | | | 708/404 |
| 2008/0297772 A1* | 12/2008 | Rogers | ............... | G01M 11/3118 |
| | | | | 356/73.1 |
| 2011/0149270 A1* | 6/2011 | Nagel | ............... | G01M 11/3145 |
| | | | | 356/73.1 |
| 2011/0236014 A1* | 9/2011 | Sekiya | ............... | G01M 11/3145 |
| | | | | 398/16 |
| 2013/0088718 A1* | 4/2013 | Perron | ............... | G01M 11/3127 |
| | | | | 356/445 |
| 2013/0114954 A1* | 5/2013 | Feng | .................. | G01M 11/3127 |
| | | | | 398/13 |
| 2013/0234708 A1* | 9/2013 | Goora | .............. | G01R 33/56572 |
| | | | | 324/309 |
| 2014/0037285 A1* | 2/2014 | Perron | ............... | G01M 11/3127 |
| | | | | 398/21 |
| 2016/0033359 A1* | 2/2016 | Gurusami | .......... | G01M 11/3145 |
| | | | | 356/73.1 |
| 2016/0109327 A1* | 4/2016 | Viswanathan | ..... | G01M 11/3145 |
| | | | | 356/73.1 |
| 2016/0277100 A1* | 9/2016 | Yoo | ....................... | H04B 10/071 |
| 2017/0322112 A1* | 11/2017 | Xu | ....................... | H04B 10/071 |

OTHER PUBLICATIONS

Tektronix, "Mini Optical Time Domain Reflectometer TekRanger® 2 TFS3031", 1999, 4 pages, accessed on Oct. 12, 2017 at https://www.tek.com/datasheet/tekranger-2-tfs3031.

Tektronix, "User Manual: TFS3031 TekRanger Mini Optical Time-Domain Reflectometer 070-9027-03", Feb. 1996, 138 pages.

Tektronix, "User Manual: TARGET1 Trace Analysis, Report Generation and Emulation Tool 071-0870-02", for firmware version 3.00, 130 pages.

\* cited by examiner

COMBINED SIGNAL RESPONSES IN AN OPTICAL TIME-DOMAIN REFLECTOMETER

BACKGROUND

Technical Field

This application is directed to an optical time-domain reflectometer and, in particular, an optical time-domain reflectometer that generates an optical time-domain reflectometry signal of an optical fiber.

Description of the Related Art

An optical time-domain reflectometer (OTDR) is used to characterize an optical fiber by transmitting optical signals into the fiber under test and receiving light that is scattered or reflected back from points along the fiber. Conventional optical time-domain reflectometers attempt to mitigate the occurrence of dead zones by decreasing a pulse width of the transmitted optical signals. However, decreasing the pulse width of the transmitted optical signals reduces the dynamic range of such conventional optical time-domain reflectometers. As a result, a low signal-to-noise ratio (SNR) is observed in backscatter regions of the response signals. Thus, while the dead zone performance of the conventional reflectometers may be improved by decreasing the pulse width, the backscatter data provided by the reflectometers becomes unreliable due to the reduced dynamic range.

It is desirable to have an optical time-domain reflectometer that improves the tradeoff between dead zone performance and dynamic range. It is desirable for the optical time-domain reflectometer to have an improved SNR over the entire range of the reflectometer's response.

BRIEF SUMMARY

In an embodiment, an optical time-domain reflectometer includes a processor configured to output a first trigger signal and a second trigger signal. The first trigger signal includes an instruction to emit a first light signal that is an impulse light signal having a non-zero power during a pulse width of the first light signal, the pulse width of the first light signal being shorter than an optical fiber under test. The second trigger signal includes an instruction to emit a second light signal that is an impulse light signal having a non-zero power during a pulse width of the second light signal and the pulse width of the second light signal is longer than the optical fiber under test;

In an embodiment, an optical time-domain reflectometer includes a light source configured to receive the first trigger signal and the second trigger signal, and, in response to receiving the first trigger signal and the second trigger signal, non-concurrently emit the first light signal and the second light signal. In an embodiment, an optical time-domain reflectometer includes an optical device configured to receive the first light signal and the second light signal and output the first light signal and the second light signal to an optical fiber.

In an embodiment, the optical device is configured to receive a third light signal that is a reflection of the first light signal by the optical fiber and a fourth light signal that is a reflection of the second light signal by the optical fiber and to output the third and fourth light signals. In an embodiment, an optical time-domain reflectometer includes a photodetector configured to receive the third light signal and the fourth light signal output by the optical device and to convert the third light signal and the fourth light signal to a first electronic signal and a second electronic signal, respectively. In an embodiment, the processor is configured to receive the first and second electronic signals and to generate an optical fiber response signal based at least in part on the first and second electronic signals.

In an embodiment, the processor is configured to generate the optical fiber response signal based at least in part on the first and second electronic signals by applying a difference filter to the second electronic signal to generate a transformed second electronic signal and generating the optical fiber response signal based at least in part on the first electronic signal and the transformed second electronic signal.

In an embodiment, the processor is configured to generate the optical fiber response signal by: terminating one or more segments of the first electronic signal at an amplitude threshold such that the amplitude-terminated first electronic signal does not exceed the amplitude threshold at the one or more segments and between the one or more segments where the amplitude of the first electronic signal is terminated, additively combine the amplitude-terminated first electronic signal with the transformed second electronic signal to form the optical fiber response signal.

In an embodiment, backscatter in the optical fiber response signal is represented by a portion of the first electronic signal and a connection event in the optical fiber response signal is represented by a portion of the transformed second electronic signal added to the amplitude-terminated first electronic signal.

In an embodiment, the processor is configured to identify the first electronic signal based at least in part on a receiving time of the first electronic signal and an emitting time of the first light signal, where the receiving time of the first electronic signal being subsequent to the emitting time of the first light signal. In an embodiment, the processor is configured to identify the second electronic signal based at least in part on a receiving time of the second electronic signal and an emitting time of the second light signal, where the receiving time of the second electronic signal being subsequent to the emitting time of the second light signal.

In an embodiment, the processor is configured to differentiate the second electronic signal prior to generating the optical fiber response signal. In an embodiment, the optical fiber response signal is generated based at least in part on the first electronic signal and the differentiated second electronic signal.

In an embodiment, differentiating the second electronic signal includes generating a difference between a first sample of the second electronic signal and a second sample of the second electronic signal that precedes the first sample.

In an embodiment, a method includes emitting, through an optical fiber, a first optical signal that is an impulse optical signal having a non-zero power during a first period of time. In an embodiment, the first period of time is shorter than a period of time necessary for the first optical signal to traverse a length of the optical fiber. In an embodiment, a method includes emitting, through the optical fiber, a second optical signal that is an impulse optical signal having a non-zero power during a second period of time. In an embodiment, the second period of time is longer than a period of time necessary for the second optical signal to traverse the length of the optical fiber.

In an embodiment, a method includes receiving a third optical signal that is a reflection of the first optical signal by the optical fiber, receiving a fourth optical signal that is a reflection of the second optical signal by the optical fiber and generating an optical time-domain reflectometry signal of the optical fiber based on the third and fourth optical signals.

In an embodiment, generating the optical time-domain reflectometry signal based on the third and fourth optical signals includes applying a difference filter to the fourth optical signal to generate a transformed fourth optical signal, terminating one or more segments of the third optical signal at an amplitude threshold such that the amplitude-terminated third optical signal does not exceed the amplitude threshold at the one or more segments and between the one or more segments where the amplitude of the third optical signal is terminated, additively combining the amplitude-terminated third optical signal with the transformed fourth optical signal to generate the optical time-domain reflectometry signal.

In an embodiment, generating the optical time-domain reflectometry signal based on the third and fourth optical signals includes applying a difference filter to the fourth optical signal to generate a transformed fourth optical signal and generating the optical time-domain reflectometry signal based on the third optical signal and the transformed fourth optical signal.

In an embodiment, the first and second periods of time are separated by an intervening third period of time and if the first optical signal is emitted before the second optical signal, the third optical signal is received during the intervening third period of time and if the second optical signal is emitted before the first optical signal, the fourth optical signal is received during the intervening third period of time.

In an embodiment, backscatter in the optical time-domain reflectometry signal is represented by a portion of the third optical signal and a connection event in the optical time-domain reflectometry signal is represented by the fourth optical signal.

In an embodiment, a non-transitory computer-readable storage medium is configured to store executable instructions, that when executed by a processor, cause the processor to output a first trigger signal, where the first trigger signal includes an instruction to emit a first optical signal that is an impulse optical signal having a non-zero power during a first period of time. The first period of time is shorter than a period of time necessary for the first optical signal to traverse a length of an optical fiber under test. In an embodiment, the executable instructions cause the processor to output a second trigger signal, where the second trigger signal includes an instruction to emit a second optical signal that is an impulse optical signal having a non-zero power during a second period of time and the second period of time is longer than a period of time necessary for the second optical signal to traverse the length of the optical fiber under test.

In an embodiment, the executable instructions cause the processor to receive data representative of a third optical signal that is a reflection of the first optical signal by the optical fiber and a fourth optical signal that is a reflection of the second optical signal by the optical fiber. In an embodiment, the executable instructions cause the processor to generate an optical time-domain reflectometry signal based at least in part on the third and fourth optical signals. In an embodiment, the executable instructions cause the processor to differentiate, by applying a difference filter, the fourth optical signal to generate a differentiated fourth optical signal and generate the optical time-domain reflectometry signal based at least in part on the third optical signal and the differentiated fourth optical signal.

In an embodiment, the executable instructions cause the processor to generate the optical time-domain reflectometry signal by stitching one or more segments of the third optical signal having an amplitude below a threshold with one or more segments of the differentiated fourth optical signal having an amplitude exceeding the threshold.

DETAILED DESCRIPTION

Figure 1:
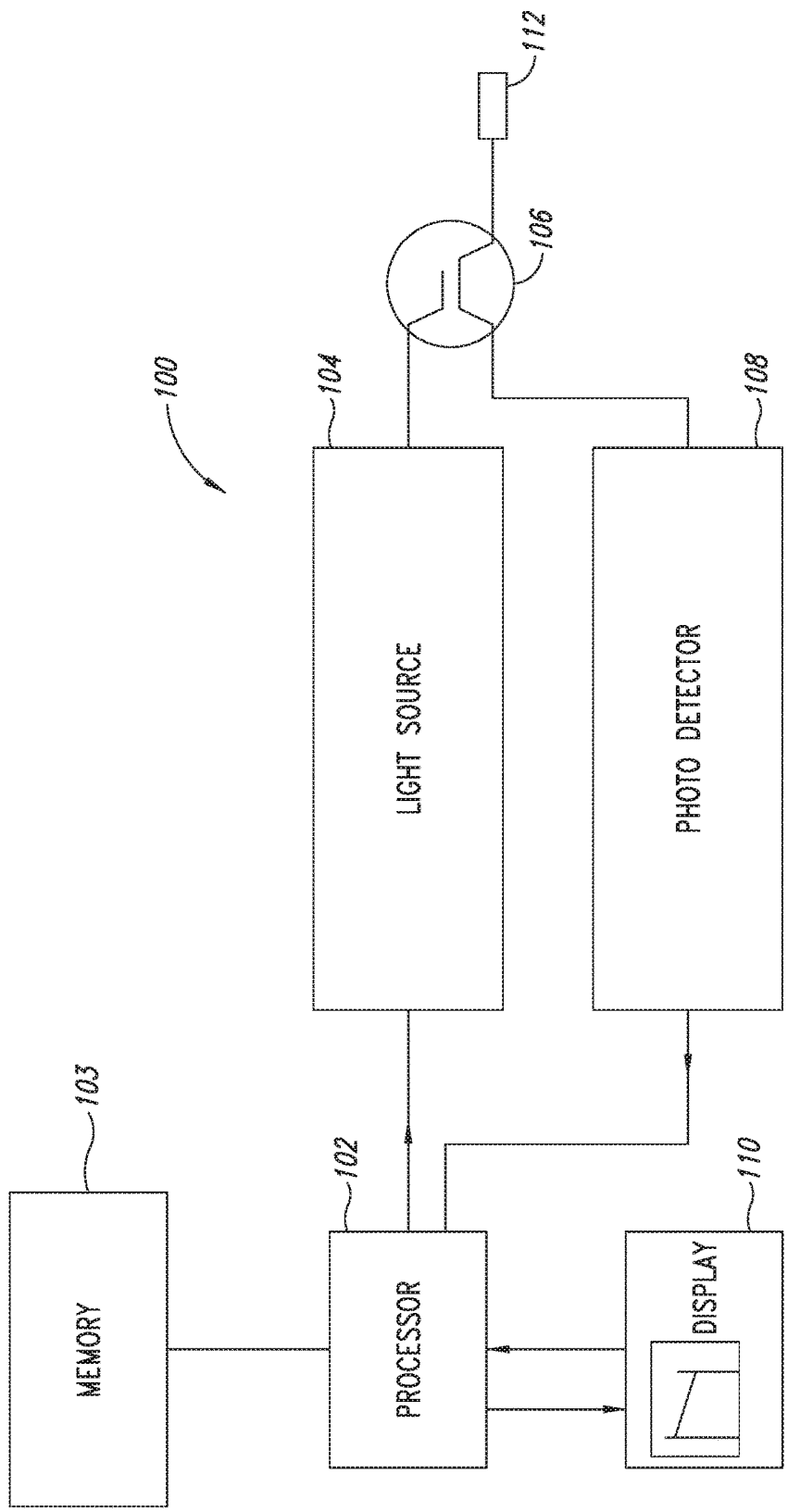
FIG. 1 shows an optical time-domain reflectometer in accordance with an embodiment.

FIG. 1 shows an optical time-domain reflectometer 100 in accordance with an embodiment. The optical time-domain reflectometer 100 includes a processor 102, memory 103, a light source 104, an optical device 106, a photodetector 108, a display 110 and an optical connector 112.

The processor 102 may be any type of device that is configured to execute instructions (computer-executable instructions) that cause the processor 102 to operate as described herein. For example, the processor may be a controller or a microcontroller and may include a central processing unit (CPU) or any other type of processing unit. The memory 103 may be any type of non-transitory computer-readable storage medium. The memory 103 may be read-only memory (ROM) or random access memory (RAM), among others. Further, the memory 103 may be static or dynamic. The memory 103 stores the computer-executable instructions that may be retrieved or accessed by the processor 102 for execution.

The processor 102 outputs a command (or a trigger signal) to the light source 104 that instructs the light source to emit optical signals for testing an optical fiber. The command may specify properties of the optical signals. The properties may include a power associated with the optical signals and shapes or forms of the optical signals. For example, the shape or form may include a step function or an impulse function. The properties may also include a pulse width of the optical signal.

The pulse width has a relationship with a length of an optical fiber under test. For example, the pulse width may be said to be equal to the length of the optical fiber under test if a duration of the optical signal or pulse is enough to traverse the length of the optical fiber. As the length of the optical fiber increases, the pulse width should also increase for the optical signal to traverse the entirety of the length of the optical fiber while the pulse is still transmitting. The pulse width may be said to be longer than the optical fiber if the emitted optical signal reaches the end of the optical fiber before the transmission optical signal is terminated and vice-versa. The length of an optical fiber that an optical signal traverses may be determined based on the pulse width, speed of light and refractive index of the optical fiber.

Further, the command may specify an intervening period of time between transmission of optical signals that allows for collecting or receiving a respective response or a reflection signal from the optical fiber in response to the emitted optical signal during the intervening period of time.

As described herein, the processor 102 may instruct the light source 104 to output two different types of signals for testing the optical fiber. Use of two different types of signals or two signals having different properties improves a dynamic range of an optical response of the optical fiber to the transmitted optical signals. The dynamic range may be defined as a range between a smallest and a largest light intensity measurement over which the light intensity measurement is reliable. Improving the dynamic range results in increasing the signal-to-noise ratio (SNR) of an optical time-domain reflectometry response signal at various light intensities.

Subsequent to transmission of the optical signals, the processor 102 receives data representative of reflections of the transmitted optical signals. The processor 102 may determine, based at least in part on the reflections of the transmitted optical signals, the optical response associated with the optical fiber. The processor 102 may output the optical response to the display 110.

The light source 104, which may be a laser source, is configured to receive a command from the processor 102. The light source 104 may be configured to output optical signals in response to receiving the command. The light source 104 may be configured to output continuous wave (CW) optical signals having a near constant power level over a pulse width. The light source 104 generates optical signals as specified by one or more commands. As specified by the one or more commands, the optical signals may have a particular power or intensity. The optical signals may have a specified shape or a form. For example, a first optical signal may be an impulse function having a first power or intensity for a first duration of the impulse function. In addition, a second optical signal may also be an impulse function having a second power or intensity for a second duration of the impulse function. The second duration may be greater than the first duration. The first and second optical signal may be continuous wave signals having a constant or near constant intensity. The light source 104 outputs each optical signal to the optical device 106. The light source 104 may transmit the two optical signals non-concurrently. The period of time between the transmission of the first optical signal and the second optical signal may be specified by the one or more commands received from the processor 102.

The optical device 106 may be an optical splitter. The optical device 106 receives the optical signals from the light source 104. The optical device 106 outputs the optical signals to the optical connector 112. The optical connector 112 may be connected to the optical fiber under evaluation or testing. The optical connector 112 outputs the optical signals into the optical fiber under test.

After outputting the optical signals, the optical time-domain reflectometer 100 receives respective reflections of the optical signals via the optical connector 112. The optical connector 112 outputs the reflections of the optical signals to the optical device 106. The optical device 106 receives the reflections of the optical signals and outputs the reflections of the optical signals to the photodetector 108.

The photodetector 108, which may be for example an avalanche photodetector, receives the reflections of the optical signals. The photodetector 108 converts the reflections of the optical signals to respective electrical signals representative of the reflections of the optical signals. The photodetector 108 outputs the electrical signals to the processor 102. The processor 102 receives the electrical signals and determines an optical response based on the received electrical signals.

The reflected signals or light may range from strong Fresnel reflections at refractive index discontinuities along the optical fiber to weak Rayleigh scattering (or backscatter) of optical fiber. This signal range is typically wider than can be resolved by a single emitted signal. An OTDR may combine multiple signals under multiple conditions to achieve a desired signal-to-noise ratio (SNR). The SNR of the backscatter may be increased through signal averaging and increasing the optical pulse width, which integrates the optical signal. However, integrating the optical signal comes at the cost of resolving closely space events (or dead zones).

The optical response can be used to characterize the optical fiber. For instance, the optical response may be plotted as a function of the length of the optical fiber. The optical response may indicate connection events in the optical fiber, such as where a connector or a splice is used. Further, the optical response may be used to identify contamination, damage, breakage or bending of the optical fiber.

Figure 2:
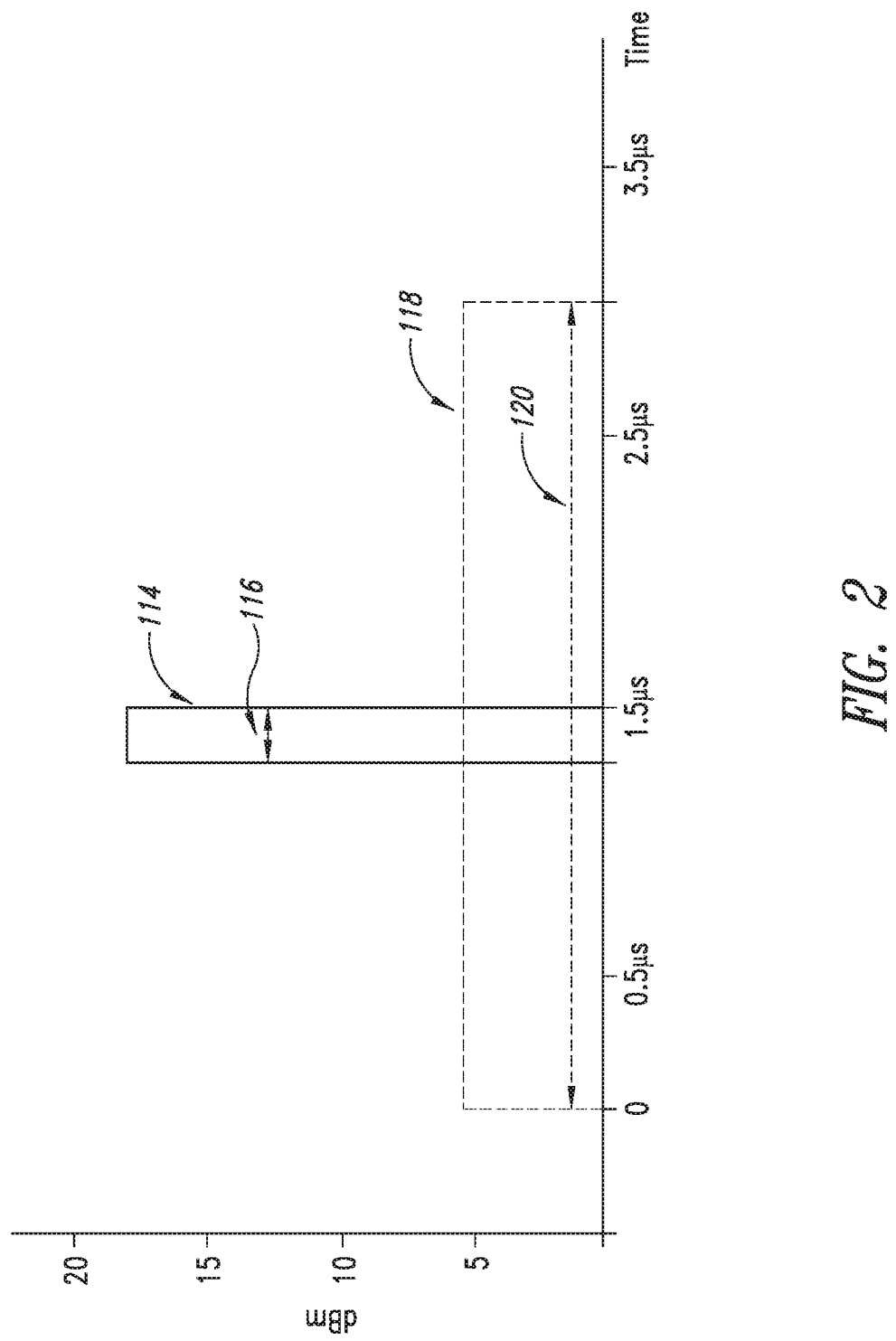
FIG. 2 shows an example of a first optical signal and a second optical signal for testing an optical fiber in accordance with an embodiment.

FIG. 2 shows an example of a first optical signal 114 and a second optical signal 118 for testing the optical fiber in accordance with an embodiment. The first optical signal 114 is an impulse signal that is active over a first period of time 116. The first optical signal 114 may be represented by an impulse function. The first optical signal 114 is inactive outside of the first period of time 116 (at time points other than those within the first period of time 116). A power or an intensity of the first optical signal 114 is represented by the amplitude of the first optical signal 114.

The second optical signal 118 is impulse signal having a wider pulse width than the first optical signal 114. The second optical signal 118 may be represented by an impulse function. The second optical signal 118 is active over a second period of time 120 that is longer than the first period of time 116. The second optical signal 118 is inactive outside of the second period of time 120 (at time points other than those within the second period of time 120). A power or an intensity of the second optical signal 118 is represented by the amplitude of the second optical signal 118, which is smaller than the amplitude of the first optical signal 114.

The first optical signal 114 and the second optical signal 118 are designed to elicit responses by the optical fiber that, when combined, produce a combined response that has an improved dynamic range. The reflections of the first optical signal 114 and the second optical signal 118 by the optical fiber are combined (e.g., stitched together) to generate an optical time-domain reflectometry signal of the optical fiber. It is noted that a power of the first optical signal 114 may be greater than that of the second optical signal 118. Further, a duration of the first optical signal 114 may be shorter than that of the second optical signal 118.

The duration of the second optical signal 118 may be greater than or equal to the length of an optical fiber under test. The duration of the first optical signal 114 may be shorter than the length of an optical fiber under test. The duration of the first optical signal 114 may be less than half of the length of the optical fiber that is under test or being characterized. For example, the duration of the first optical signal 114 may be less than a fifth of the length of the optical fiber under test.

In such embodiments, due to the shorter duration and increased power of the first optical signal 114, the response to the first optical signal 114 may be associated with a higher gain. Further, the response to the first optical signal 114 may be used to represent backscatter in the optical fiber under test. Conversely, due to the longer duration and reduced power of the second optical signal 118, the response to the second optical signal may be associated with a lower gain than that of the first optical signal 114. The response to the second optical signal 118 may be used to represent strong Fresnel reflections (for example, connection events).

In response to emitting the first optical signal 114 through an optical fiber, a first response signal that is a reflection of the first optical signal 114 is received. In addition, in response to emitting the second optical signal 118 through the optical fiber, a second response signal that is a reflection of the second optical signal 118 is received.

Figure 3:
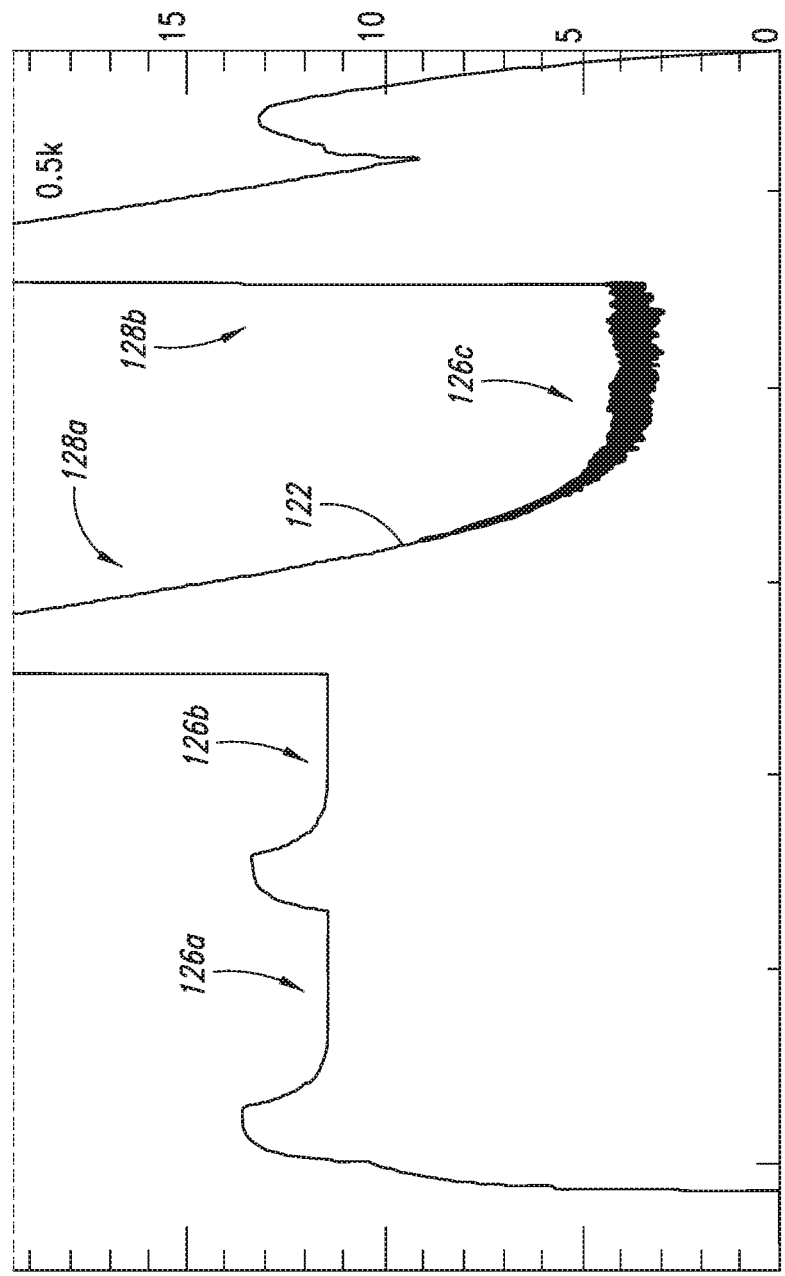
FIG. 3 shows a diagram of a first response signal in accordance with an embodiment.

FIG. 3 shows a diagram of a first response signal 122 in accordance with an embodiment. The first response signal 122 represents light that is scattered or reflected by the optical fiber in response to emitting the first optical signal 114 through the optical fiber.

The first response signal 122 provides a relatively high signal-to-noise (SNR) response for backscatter 126a, 126b, 126c. The SNR of the backscatter 126a, 126b, 126c in the first response signal 122 is greater than that in the second response signal discussed below. Further, the first response signal 122 has a relatively low SNR for connection events 128a, 128b. The SNR for connection events 128a, 128b is lower in first response signal 122 than the second response signal described herein.

Figure 4:
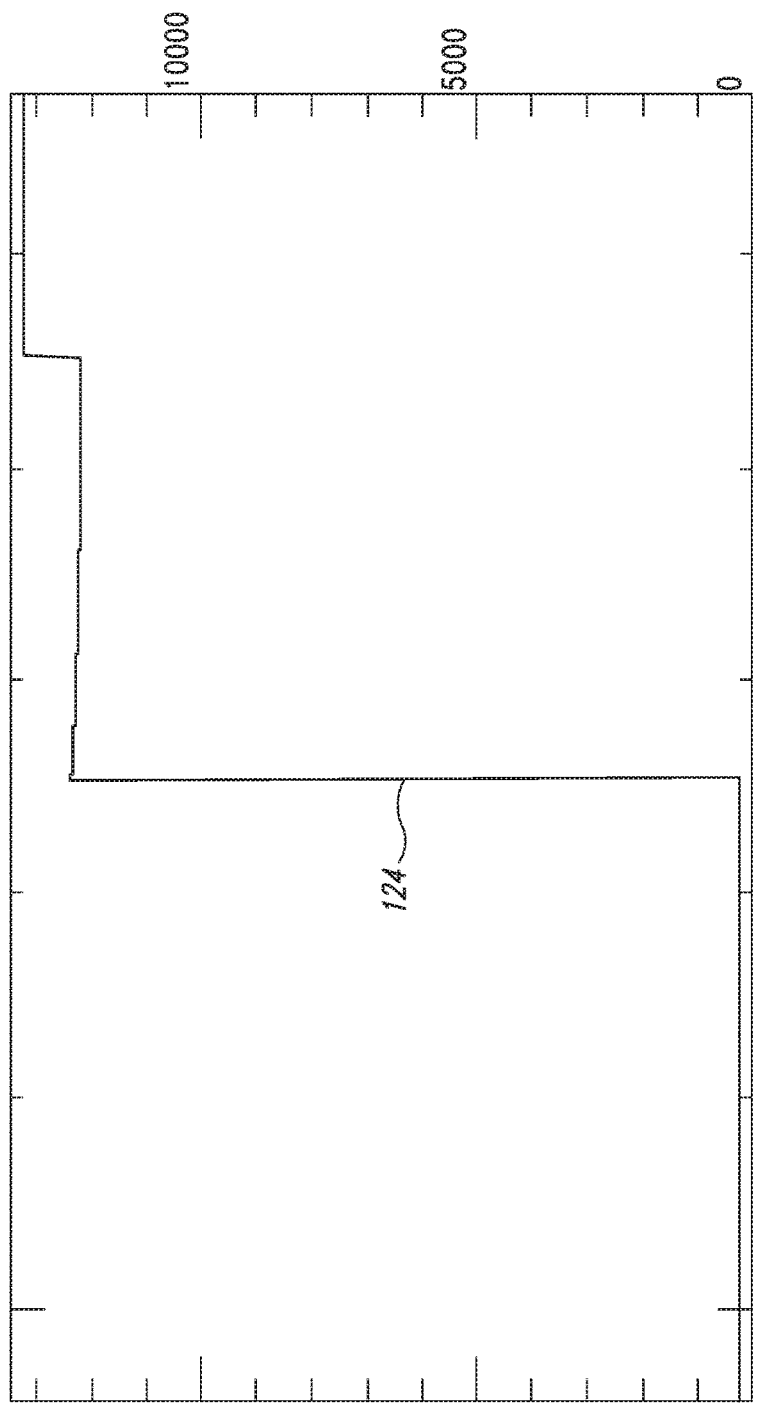
FIG. 4 shows a diagram of a second response signal in accordance with an embodiment.

FIG. 4 shows a diagram of the second response signal 124 in accordance with an embodiment. The second response signal 124 represents light that is scattered or reflected by the optical fiber in response to emitting the second optical signal 118 through the optical fiber. Due to the wider pulse of the second optical signal 118, the returned second response signal 124 is step-wise increasing. The second response signal 124 is step-wise increasing because its pulse width is longer than that necessary to traverse the optical fiber under test. As a result, the second response signal 124 is integrated. A step in the second response signal 124 represents that a traversal of the optical fiber by the second optical signal 118 has occurred.

The second response signal may be transformed from a step response signal to an impulse response by filtering or differentiation. The second response signal 124 may also be scaled to adjust amplitude of the second response signal 124. The amplitude of the second response signal 124 may be adjusted such that the amplitude aligns with the amplitude of the first response signal 122.

The second response signal 124 may be differentiated by applying a difference filter to the second response signal 124. The second response signal 124 may be differentiated as follows:

$$y[n]=x[n]-x[n-1],\quad\text{Equation (1)}$$

where y[n] is an nth sample the differentiated second response signal, x[n] is an nth sample the second response signal 124 and x[n−1] is the preceding sample of x[n]. It is noted that the size of the differentiation window (or difference filter width) may be greater than one sample. For example, x[n−2] or x[n−3] may be used in place of x[n−1] in Equation (1) to change the differentiation window size to two or three samples, respectively. Further, x[n−2] or x[n−3] may be used in addition to x[n−1] in Equation (1). Increasing the size of the differentiation window may improve the dynamic range at the expense of dead zone performance, and conversely, reducing the size of the differentiation window may improve dead zone performance at the expense of the dynamic range. The size of the differentiation window may be selected so as to yield a desired tradeoff between the dynamic range and dead zone performance. For example, the size of the differentiation window may be selected based on experimental tests performed on an optical fiber.

The differentiated second response signal may be used instead of the second response signal 124 for generating an optical fiber response signal as described herein. Differentiating the second response signal 124 transforms the second response signal 124 from a step response signal to an impulse response signal. As an impulse response, the differentiated second response signal may be more suitably combined with the first response signal 122. Further, the second response signal 124 may be scaled such that its amplitude aligns with that of the first response signal 114.

Figure 5:
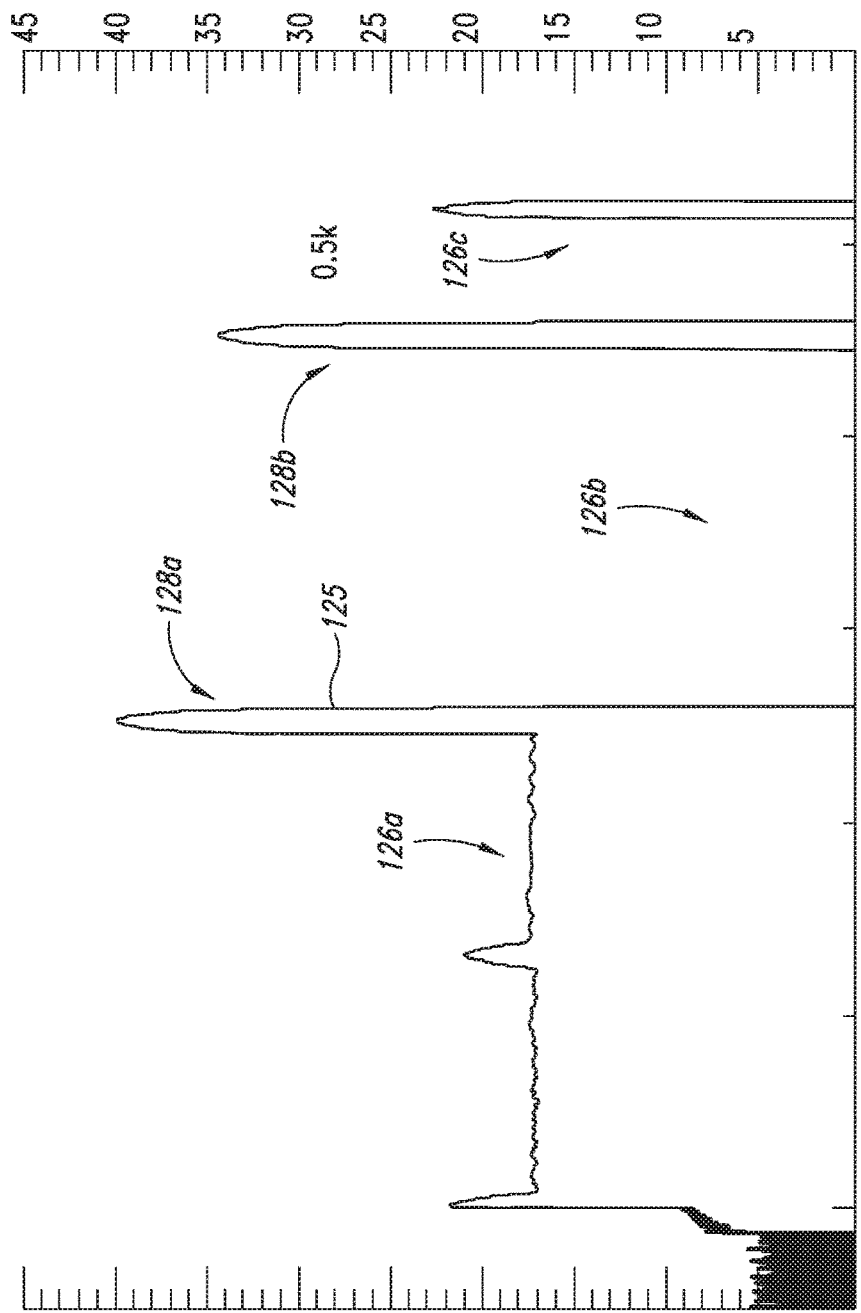
FIG. 5 shows a diagram of a transformed second response signal in accordance with an embodiment.

FIG. 5 shows a diagram of a transformed second response signal 125 in accordance with an embodiment. The transformed second response signal 125 may be the result of transforming the second response signal 124, for example, by differentiating the second response signal 124 or applying a difference filter to the second response signal 124. The lower gain of the transformed second response signal 125 provides higher headroom for detecting the full peak of the Fresnel reflections. However, the backscatter 126a, 126b, 126c in the transformed second response signal 125 is associated with a lower SNR than that of the first response signal 122.

Figure 6:
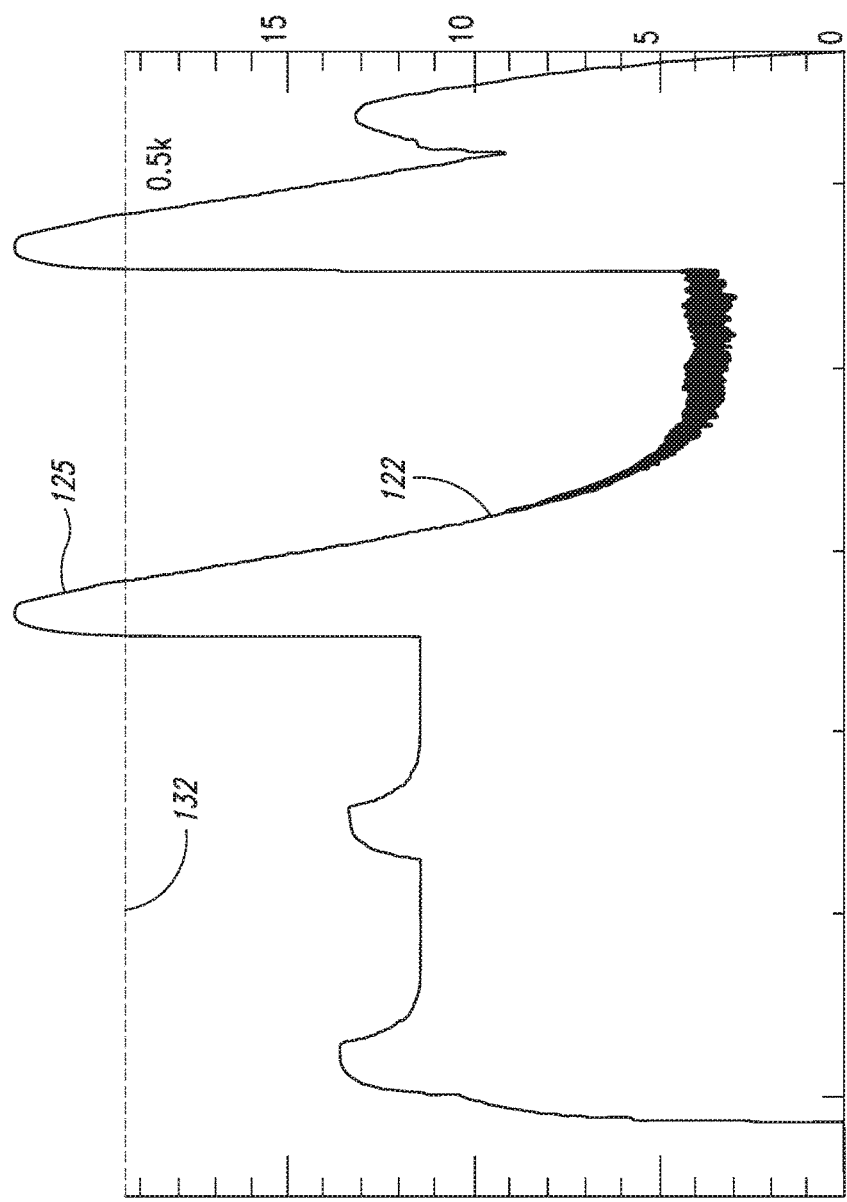
FIG. 6 shows an optical fiber response signal generated by combining the first response signal and the transformed second response signal.

FIG. 6 shows an optical fiber response signal 130 generated by combining the first response signal 122 and the transformed second response signal 125. The optical fiber response signal 130 may be generated by the processor 102 described with reference to FIG. 1. The processor 102 may be configured with an amplitude threshold 132 and may generate the optical fiber response signal 130 by combining portions of the transformed second response signal 125 having amplitudes greater than or equal to the amplitude threshold 132 with portions of the first response signal 122 having amplitudes less than the amplitude threshold 132.

For example, to generate the optical fiber response signal 130, the first response signal 122 may be terminated at the amplitude threshold 132 where necessary (i.e., where the first response signal 122 exceeds the amplitude threshold 132). The terminated segments of the first response signal 122 may then be additively combined with corresponding segments of the transformed second optical signal 125, i.e., to fill the gaps between the terminated segments of the first response signal 122, to form the optical fiber response signal 130.

The additive combination may be performed, for each amplitude-terminated segment, by adding the amplitude of the first response signal 122 (which where terminated, has an amplitude equal to the amplitude threshold 132) with an amplitude of the transformed second response signal 125. Prior to the additive combination, the amplitude of the transformed second response signal 125 may be compensated (or reduced) by the amplitude threshold 132 to avoid "double counting" the amplitude threshold 132 in the optical fiber response signal 130. The amplitude threshold 132 may be subtracted from the amplitude of the transformed second response signal 125 prior to the additive combination. In this manner, a backscatter of the generated optical fiber response signal 130 is represented by one or more portions of the first response signal 122 while connection events of the generated optical fiber response signal 130 are represented by one or more portions of the second response signal 124 or transformation thereof.

It is noted that for some relatively wide pulse widths, the backscatter range may be more than the dynamic range of the impulse response. The backscatter at the near end may be represented by the second response signal 124 or the transformation thereof. The backscatter may be "stitched in" from the transformed second response signal. Further, certain connection events may be low in amplitude such that they may can be represented by the first response signal 122.

The optical fiber response signal 130 may be generated by identifying one or more first segments of the first response signal 122 having an amplitude below amplitude threshold 132 and one or more second segments of the first response signal 122 having an amplitude equal to or above amplitude threshold 132. Further, one or more segments of the transformed second response signal 125 that correspond to the one or more second segments of the first response signal 122 are also identified. The optical fiber response signal 130 may be generated by stitching together the one or more first segments of the first response signal 122 and the one or more segments of the transformed second response signal 125. In the stitching, the one or more segments of the transformed second response signal 125 take the place of the one or more second segments of the first response signal 122.

Further, one or more ranges of amplitudes may be established. In a range of amplitudes, part of the optical fiber response signal 130 may come from the first response signal 122 and the transformed second response signal 125. For example, in a range of amplitudes, the first response signal 122 and the transformed second response signal 125 or segments thereof may be combined to form a portion of the optical fiber response signal 130.

It is noted that as the length of an optical fiber increases the dynamic range required to evaluate the optical fiber also increases. The SNR of the backscatter decreases for farther portions of the optical fiber, thus, reducing the dynamic range. Accordingly, a wider dynamic range is needed to capture the backscatter. Furthermore, as the presence of reflective debris can make the Fresnel reflection stronger, which increases the upper boundary in the optical fiber increase, the dynamic range needed also increases. That is because reflective debris returns intense light that pushes the upper boundary of the dynamic range at the expense of its lower boundary. A wider dynamic range will then be needed to maintain SNR of the backscatter.

The step response of the second response signal 124 results in better dynamic range and accurate stitching of the two signals. Further, the backscatter of the two signals can be better aligned. In addition, the processor may adjust the width of the difference filter thereby allowing for performing a tradeoff between dynamic range and dead zone performance without the need to acquire further response signals.

In addition, the transformed second response signal 125 has a narrower dead zone than the first response signal 122. The narrower dead zone allows for the separation of events that are closely spaced, such as events 128b and 128c in FIG. 5.

The optical time-domain reflectometer 100 described herein is advantageous in that the resulting dynamic range of the response signal is increased allowing for capturing both connection events and low SNR backscatter. That is unlike conventional reflectometers that attempt to mitigate the dynamic range deficiency by emitting multiple optical signals and adjusting the gains of the received response signals, respectively (for example, by adjusting a photodetector gain or a gain of an amplifier that operates on the response signals). However, in many instances, conventional reflectometers lack gain settings that provide a high enough gain to capture the backscatter and a low enough gain to capture connection events without degrading dead zone performance.

It is noted that conventional optical time-domain reflectometers experience dead zones. A dead zone is generally recognized as a time period (or a length of an optical fiber) in a response signal where the conventional optical time-domain reflectometer is temporary blinded by a large amount of reflected light (due to an event). As a result, the conventional optical time-domain reflectometer may not be capable of detecting subsequent events close in time or distance. To mitigate dead zones, conventional optical time-domain reflectometers are configured to emit impulse optical signals having shorter pulse widths. However, reducing the pulse width of the emitted signals decreases the SNR of the backscatter and decreases the dynamic range of the conventional optical time-domain reflectometers.

Combining the first response signal 122 and the transformed second response signal 125 to generate the optical fiber response signal 130 as described herein improves the tradeoff between the dynamic range and the occurrence of dead zones. The fact that the emitted first optical signal 114 has a narrower pulse width improves the backscatter SNR of the optical time-domain reflectometer 100 described herein. Conversely, the emitted second optical signal 118 has a wider pulse width. The second response signal 124, which is the reflection of the second optical signal 118, is used for connection events. As described herein, the transformed second response signal 125 distinguishes between closely spaced connection events.

In an embodiment, a pulse width of the first optical signal 114 is between 3 nanoseconds (ns) and 20 microseconds ($\mu$s), and a power of the first optical signal 114 may be 70 milliwatts (mW). Further, a pulse width of the second optical signal 118 may be greater than 20 $\mu$s, whereas a power of the second optical signal 118 may be 2 or 4 mW.

Figure 7:
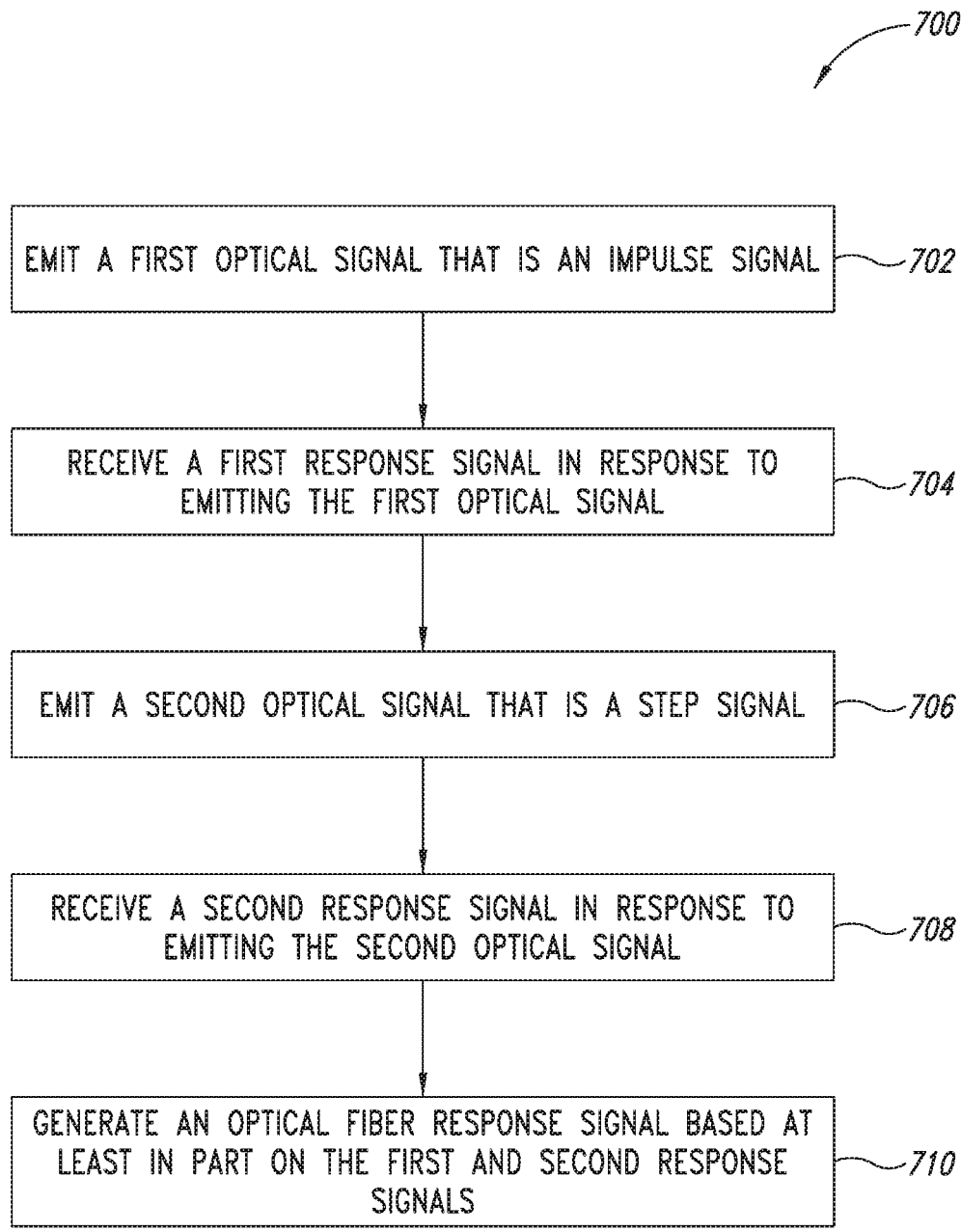
FIG. 7 shows a flow diagram of a method for generating the optical fiber response signal.

FIG. 7 shows a flow diagram of a method 700 for generating the optical fiber response signal 130. In the method 700, a light source, such as the light source 104 described with reference to FIG. 1, emits a first optical signal that is an impulse signal at block 702. The first optical signal is emitted through an optical fiber and may have a pulse width that is shorter than the optical fiber.

The first optical signal or a portion thereof is reflected by the optical fiber. The reflection is captured by a photodetector, such as the photodetector 108 described with reference to FIG. 1. As a result, the photodetector receives a first response signal in response to emitting the first optical signal at block 704.

At a subsequent time following receipt of the reflection of the first optical signal, the light source emits, at block 706, a second optical signal that is an impulse signal having a longer pulse width than the optical fiber. Similar to the first optical signal, the second optical signal is reflected by the optical fiber. As a result, the photodetector, at block 708, receives a second response signal in response the emitted second optical signal. The photodetector outputs the first and second response signals or data representative thereof to a processor, such as the processor 102 described with reference to FIG. 1.

The processor is configured to identify the first response signal based on a receiving time of the first response signal and an emitting time of the first optical signal. When the first optical signal is emitted into the optical fiber, the optical fiber reflects a portion of or all of the first optical signal. Consequently, the first response signal is received. The receiving time of the first response signal is subsequent to the emitting time of the first optical signal. Similarly, the processor is configured to identify the second response signal based on a receiving time of the second response signal and an emitting time of the second optical signal, where the receiving time of the second response signal is after the emitting time of the second optical signal.

The processor, at block 710, generates an optical fiber response signal based at least in part on the first and second response signals, e.g., as described above with regard to FIG. 6. After generating the optical fiber response signal, the processor may output data representative of the optical fiber response signal to a display, such as the display 110 described with reference to FIG. 1. The display 110 displays the optical fiber response signal. The displayed optical fiber response signal may be examined by personnel in order to evaluate the optical fiber.

It is noted that although one acquisition of the optical fiber response signal is described with reference to FIG. 7, a plurality of optical fiber response signals may be acquired. Each optical fiber response signal may be acquired using first and second optical signals that vary in power, pulse width or shape. The plurality of optical fiber response signals may then be combined to generate an overall optical fiber response signal. The combination may be performed by averaging the plurality of optical fiber response signals or as another function of the plurality of optical fiber response signals. Alternatively, the plurality of optical fiber response signals may be independently displayed or otherwise provided to a user.

It is noted that performing multiple acquisitions may increases optical fiber testing time. That may be the case when a laser source operating at a 1 duty cycle is used to emit the optical signals. In this case, the laser source may only actively emit the optical signals for 1% of the time during the active period of the duty cycle and may be turned off during the remaining 99% of the time. Further, combining multiple acquisitions may affect dead zone performance. The performance may be improved if an optical fiber response signal is averaged with other optical fiber response signals having a better dead zone performance and vice-versa.

Figure 8:
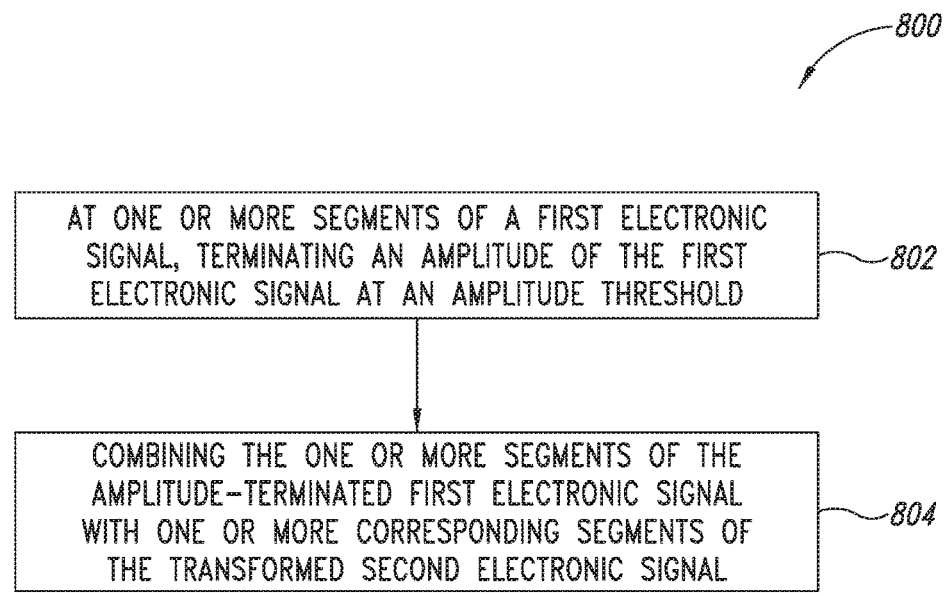
FIG. 8 shows a flow diagram of a method for generating the optical fiber response signal.

FIG. 8 shows a flow diagram of a method 800 for generating the optical fiber response signal 130. At block 802, a processor, such as the processor 102 described with reference to FIG. 1, terminates one or more segments of the first electronic response signal at an amplitude threshold. The amplitude-terminated first electronic response signal does not exceed the amplitude threshold at the one or more segments. The processor obtains transformed second electronic signal by applying a difference filter to the second electronic signal as described herein. At block 804, the processor combines the one or more segments of the amplitude-terminated first electronic signal with one or more segments of the transformed second electronic signal, e.g., by adding the signals together, to form the optical fiber response signal 130.

In an embodiment, responses to a plurality of types of signals may be combined to generate the optical fiber response signal 130. The types of signals may include impulse, step, code correlation and pseudo-random code signals.

It should be understood that the various embodiments described above can be combined to provide further embodiments. These and other changes can be made to the illustrated embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An optical time-domain reflectometer comprising:
   a processor configured to output a first trigger signal and a second trigger signal, the first trigger signal including an instruction to emit a first light signal that is an impulse light signal having a non-zero power during a pulse width of the first light signal, the pulse width of the first light signal being shorter than an optical fiber under test, and the second trigger signal including an instruction to emit a second light signal that is an impulse light signal having a non-zero power during a pulse width of the second light signal, the pulse width of the second light signal being longer than the optical fiber under test;
   a light source configured to receive the first trigger signal and the second trigger signal, and, in response to receiving the first trigger signal and the second trigger signal, non-concurrently emit the first light signal and the second light signal;
   an optical device configured to receive the first light signal and the second light signal and output the first light signal and the second light signal to an optical fiber; and
   a photodetector configured to receive a third light signal that is a reflection of the first light signal by the optical fiber and a fourth light signal that is a reflection of the second light signal by the optical fiber and convert the third light signal and the fourth light signal to a first electronic signal and a second electronic signal, respectively, wherein:
      the processor is configured to receive the first and second electronic signals and to generate an optical fiber response signal by:
         applying a difference filter to the second electronic signal to generate a transformed second electronic signal;
         stitching one or more segments of the first electronic signal with one or more segments of the transformed second electronic signal;
         terminating the one or more segments of the first electronic signal at an amplitude threshold such that the amplitude-terminated first electronic signal does not exceed the amplitude threshold at the one or more segments of the first electronic signal; and
         between the one or more segments of the first electronic signal where the amplitude of the first electronic signal is terminated, additively combining the amplitude-terminated first electronic signal with the transformed second electronic signal to form the optical fiber response signal.

2. The optical time-domain reflectometer of claim 1, wherein the optical device is configured to receive the third light signal and the fourth light signal and to output the third and fourth light signals to the photodetector.

3. The optical time-domain reflectometer of claim 1, wherein backscatter in the optical fiber response signal is represented by the one or more segments of the first electronic signal and a connection event in the optical fiber response signal is represented by the one or more segments of the transformed second electronic signal.

4. The optical time-domain reflectometer of claim 1, wherein the processor is configured to identify the first electronic signal based at least in part on a receiving time of the first electronic signal and an emitting time of the first light signal, the receiving time of the first electronic signal being subsequent to the emitting time of the first light signal, and wherein the processor is configured to identify the second electronic signal based at least in part on a receiving time of the second electronic signal and an emitting time of the second light signal, the receiving time of the second electronic signal being subsequent to the emitting time of the second light signal.

5. The optical time-domain reflectometer of claim 1, wherein the processor is configured to differentiate the second electronic signal prior to generating the optical fiber response signal and wherein the optical fiber response signal is generated based at least in part on the first electronic signal and the differentiated second electronic signal.

6. The optical time-domain reflectometer of claim 5, wherein differentiating the second electronic signal includes generating a difference between a first sample of the second electronic signal and a second sample of the second electronic signal that precedes the first sample.

7. The optical time-domain reflectometer of claim 1, wherein the processor is configured to generate the optical time-domain reflectometry signal by stitching the one or more segments of the first electronic signal having an amplitude below the amplitude threshold with the one or more segments of the transformed second electronic signal having an amplitude exceeding the amplitude threshold.

8. A method comprising:
emitting, through an optical fiber, a first optical signal that is an impulse optical signal having a non-zero power during a first period of time, the first period of time being shorter than a period of time necessary for the first optical signal to traverse a length of the optical fiber;
emitting, through the optical fiber, a second optical signal that is an impulse optical signal having a non-zero power during a second period of time, the second period of time being longer than a period of time necessary for the second optical signal to traverse the length of the optical fiber;
receiving a third optical signal that is a reflection of the first optical signal by the optical fiber;
receiving a fourth optical signal that is a reflection of the second optical signal by the optical fiber; and
generating an optical time-domain reflectometry signal of the optical fiber by:
applying a difference filter the fourth optical signal to generate a transformed fourth optical signal;
stitching one or more segments of the third optical signal with one or more segments of the transformed fourth optical signal;
terminating the one or more segments of the third optical signal at an amplitude threshold such that the amplitude-terminated third optical signal does not exceed the amplitude threshold at the one or more segments of the third optical signal; and
between the one or more segments of the third optical signal where the amplitude of the third optical signal is terminated, additively combining the amplitude-terminated third optical signal with the transformed fourth optical signal to generate the optical time-domain reflectometry signal.

9. The method of claim 8, wherein generating the optical time-domain reflectometry signal includes:
combining a segment of the third optical signal with a segment of the transformed fourth optical signal to generate a segment of the optical time-domain reflectometry signal.

10. The method of claim 8, wherein the first and second periods of time are separated by an intervening third period of time and wherein if the first optical signal is emitted before the second optical signal, the third optical signal is received during the intervening third period of time and if the second optical signal is emitted before the first optical signal, the fourth optical signal is received during the intervening third period of time.

11. The method of claim 8, wherein backscatter in the optical time-domain reflectometry signal is represented by at least one of: a portion of the third optical signal and a portion of the transformed fourth optical signal.

12. The method of claim 8, wherein generating the optical time-domain reflectometry signal includes:
stitching the one or more segments of the third optical signal having an amplitude below the amplitude threshold with the one or more segments of the transformed fourth optical signal having an amplitude exceeding the amplitude threshold.

13. A non-transitory computer-readable storage medium configured to store executable instructions, that when executed by a processor, cause the processor to:
output a first trigger signal, the first trigger signal including an instruction to emit a first optical signal that is an impulse optical signal having a non-zero power during a first period of time, the first period of time being shorter than a period of time necessary for the first optical signal to traverse a length of an optical fiber under test;
output a second trigger signal, the second trigger signal including an instruction to emit a second optical signal that is an impulse optical signal having a non-zero power during a second period of time, the second period of time being longer than a period of time necessary for the second optical signal to traverse the length of the optical fiber under test;
receive data representative of a third optical signal that is a reflection of the first optical signal by the optical fiber and a fourth optical signal that is a reflection of the second optical signal by the optical fiber; and
generate an optical time-domain reflectometry signal by:
applying a difference filter to the fourth optical signal to generate a transformed fourth optical signal;
stitching one or more segments of the third optical signal with one or more segments of the transformed fourth optical signal;
terminating the one or more segments of the third optical signal at an amplitude threshold such that the amplitude-terminated third optical signal does not exceed the amplitude threshold at the one or more segments of the third optical signal; and
between the one or more segments of the third optical signal where the amplitude of the third optical signal is terminated, additively combining the amplitude-terminated third optical signal with the transformed fourth optical signal to generate the optical time-domain reflectometry signal.

14. The non-transitory computer-readable storage medium of claim 13, wherein the executable instructions cause the processor to:

generate the optical time-domain reflectometry signal by stitching the one or more segments of the third optical signal having an amplitude below the amplitude threshold with the one or more segments of the transformed fourth optical signal having an amplitude exceeding the amplitude threshold.

* * * * *

UNITED STATES PATENT AND TRADEMARK OFFICE
CERTIFICATE OF CORRECTION

PATENT NO. : 10,305,586 B1
APPLICATION NO. : 15/473387
DATED : May 28, 2019
INVENTOR(S) : Harlan L. Kassler et al.

Page 1 of 1

It is certified that error appears in the above-identified patent and that said Letters Patent is hereby corrected as shown below:

In the Claims

Column 13, Line 52 Claim 8:
"applying a difference filter the fourth optical" should read, --applying a difference filter to the fourth optical--.

Signed and Sealed this
Fifth Day of May, 2020

Andrei Iancu
*Director of the United States Patent and Trademark Office*